United States Patent [19]

Leedom

[11] 4,040,634
[45] Aug. 9, 1977

[54] OVERHEAD DISC RECORD GROUNDING APPARATUS

[75] Inventor: Marvin Allan Leedom, S. Brunswick Township, Middlesex County, N.J.

[73] Assignee: RCA Corporation, New York, N.Y.

[21] Appl. No.: 676,288

[22] Filed: Apr. 12, 1976

Related U.S. Application Data

[62] Division of Ser. No. 557,180, March 10, 1975, abandoned.

[51] Int. Cl.$^2$ .............................................. G11B 1/00
[52] U.S. Cl. .................. 274/2; 179/100.1 B; 274/10 S; 358/128
[58] Field of Search ............... 274/10 S, 10 SS, 39 R, 274/2; 178/6.6 R, 6.6 A, 6.6 DD; 179/100.1 B; 346/153; 358/128

[56] References Cited

U.S. PATENT DOCUMENTS

| 3,871,663 | 3/1975 | Stave | 274/10 S |
| 3,891,796 | 6/1975 | Takahara et al. | 178/6.6 DD |

Primary Examiner—Steven L. Stephan
Attorney, Agent, or Firm—Eugene M. Whitacre; William H. Meagher; Dilip A. Kulkarni

[57] ABSTRACT

In a system for playing back prerecorded information from a disc record by a groove-engaging signal pickup, an overhead signal pickup drive apparatus is provided. A support housing is reciprocably mounted in the cover of the player for movement radially of the disc record. A pickup arm, carrying the signal pickup at one end, is pivotally mounted in the support housing at its other end. Means ae mounted in the cover for driving, during playback, the support housing radially with respect to the disc record independent of the radial motion of the groove-engaged signal pickup due to the spiral groove in a manner that maintains the axis of the pickup/arm substantially tangential to the groove at the point of pickup record engagement. A grounding apparatus also mounted in the cover is provided for grounding a disc record having a coating capable of accumulating electrical charge.

4 Claims, 4 Drawing Figures

OVERHEAD DISC RECORD GROUNDING APPARATUS

This application is a division of U.S. patent application, Ser. No. 557,180, filed on Mar. 10, 1975, and now abandoned.

This invention relates generally to video disc player mechanisms, and specifically relates to an apparatus mounted in the cover for grounding a video disc record having a conductive coating capable of accumulating electrical charge.

In certain video disc systems, video information is recorded by means of geometric variations in the bottom of a smooth spiral groove on the surface of a disc record. The disc record surface includes a coating of conductive material which is preferably covered with a thin deposit of dielectric material. A signal pickup subject to engagement with the spiral groove includes a conductive surface which cooperates with conductive coating and the dielectric deposit of the disc record to form a capacitor. When the disc record is rotated, an edge of conductive surface of the signal pickup, while riding in the disc record groove, recovers capacitive variations due to geometric variations in the bottom of the smooth spiral groove. The capacitive variations, which represent the prerecorded video information, are processed and applied to a conventional television receiver for reproduction. The variable capacitor concept is described in the U.S. Pat. No. 3,842,194, issued to J. K. Clemens, entitled, "INFORMATION RECORDS AND RECORDING/PLAYBACK SYSTEMS THEREFOR", and assigned to the present assignee.

The capacitive variations, between the conductive coating on the disc record and the conductive surface of the signal pickup, are a part of a tuned circuit. The resonant frequency of the tuned circuit varies as the capacitance between the signal pickup and the disc record changes. A flexibly mounted conductive member (e.g., pickup arm) is provided; with its free end electrically and mechanically coupled to the conductive surface of the signal pickup, and its pivoted end movably connected to a hollow box-like support housing also made of conductive material. The conductive member mechanically supports the signal pickup, and also forms a transmission line with the surrounding conductive support housing. The tuned circuit includes the reactance of the transmission line and the capacitance between the signal pickup and the disc record. The tuned circuit is energized by a fixed, high frequency (for example, 915 MHz) oscillator. The response of the tuned circuit to the oscillator excitation signal changes as a function of prerecorded information on the disc record. The output signals from the tuned circuit, indicative of the information prerecordedon the disc record, are subsequently applied to a suitable signal processing circuit coupled to a television receiver. The transmission line concept is described in the U.S. Pat. No. 3,872,265, issued to S. E. Hilliker, on Mar. 18, 1975, entitled, "VIDEO DISC TRANSMISSION LINE AND STYLUS RF RETURN SYSTEMS", and also assigned to the present assignee.

The support housing, carrying the pickup arm assembly, is mounted on a suitable signal pickup drive mechanism for driving the pickup arm assembly transversely across the disc record in proper time relationship with the rotational speed of the disc record. The signal pickup drive mechanism drives the signal pickup radially inward toward the center of rotation of the disc record such that the attitude of the signal pickup conductive surface is held relatively constant with respect to the groove. It must be noted that a positive signal pickup drive mechanism is desirable as relatively fragile walls of video disc record grooves, (for example, in a disc record having 4,000 to 6,000 grooves per inch) used in the aforementioned Clemens' type systems, cannot be dependably relied upon for tracking (that is, pulling the pickup arm assembly across the recorded surface of the disc record). A novel overhead signal pickup drive mechanism mounted in the cover is disclosed herein.

A signal pickup drive mechanism mounted in the cover is advantageous for several reasons. First, in a system using the above-discussed high frequency (for example, 915 MHz) transmission line and associated circuits, it is desirable to provide effective shielding for radiation at the frequencies employed in order to avoid deleterious interference with the ambient electronic equipment. An advantageous shielding arrangement can be obtained when the support housing and the pickup arm circuits are semi-permanently sealed in a metal enclosure, such as a cover of the playback apparatus with appropriate opening for allowing the signal pickup to ride in the disc record groove.

Second, in a conventional playback apparatus the pickup arm carrying the signal pickup moves to and from a rest position which is located at a distance greater than the disc record radius from the center of the turntable. Therefore, each time a disc record is played the pickup arm makes wasteful movements to clear the disc record played; for example, from the rest position to a play position at the beginning of a playback cycle, and from the play position to the rest position at the end of a playback cycle. Therefore, it is desirable to eliminate these wasteful movements of the pickup arm assembly by locating the rest position of the pickup arm assembly over the starting groove of a disc record placed on the turntable of the player. The overhead signal pickup drive apparatus pursuant to the present invention is especially suitable for the above-mentioned requirement.

Third, location of the rest position of the pickup arm assembly over the starting groove of the disc record, rather than beyond the outside diameter of the disc record, permits reduction in the lateral dimension of the player, whereby less floor space is required for the player.

Fourth, it is desirable to locate certain player mechanisms in the base rather than the cover of the player; for example, a turntable speed control mechanism. Thus, location of the signal pickup drive apparatus in the cover rather than the base makes room in the base for the player mechanisms which must be preferably located in the base.

It is desirable, as explained in U.S. Pat. No. 3,871,663, issued to F. W. Stave, to provide the playback system with means to ground the conductive coating of the disc record subject to playback. It is a feature of the present invention to provide an overhead grounding apparatus to establish a good direct current conductive connection between the disc record conductive coating and a point of reference potential.

In a system for playing back prerecorded signals from a disc record by a groove-engaging signal pickup, an overhead signal pickup drive apparatus is provided. A support housing is reciprocably mounted in the cover of the player for movement radially of the disc record. A pickup arm, carrying the signal pickup at one end, is pivotally mounted in the support housing at its other end. Means are mounted in the cover for driving the support housing during playback radially of the disc record independent of the radial motion of the groove engaged signal pickup due to the spiral groove in a manner that maintains the axis of the pickup arm substantially tangential to the groove at the point of the pickup/record engagement.

Pursuant to a feature of the invention, a disc record grounding apparatus, also mounted in the cover, is provided suitable for use with a disc record having a conductive coating capable of accumulating electrical charge thereon. A portion of the disc record conductive coating is exposed in an area surrounding the centering hole of the disc record. A multiple, including one, of conductive spring elements are rotatably coupled to the cover of the player. The spring elements are electrically coupled to a point of reference potential for the player. When the cover is secured onto the base of the player, the axis of rotation of the rotatable spring elements substantially coincides with the axis of rotation of the disc record. A plurality of conductive pads are affixed to the spring elements such that, when the cover is secured onto the base, the conductive pads are firmly pressed by the spring elements against the exposed conductive surface of the disc record. The conductive pads mechanically and electrically couple the exposed conductive surface of the disc record with the spring elements for discharging accumulated charge on the disc record conductive coating to the point of reference potential. As the electrical coupling between the disc record conductive coating and the reference potential is accomplished without any relative motion between the conductive pads and the disc record conductive coating, the life of the disc record is extended.

A better understanding of the present invention may be obtained from the following detailed description of a specific embodiment thereof when taken in conjuction with the accompany drawings in which.

Figure 1:
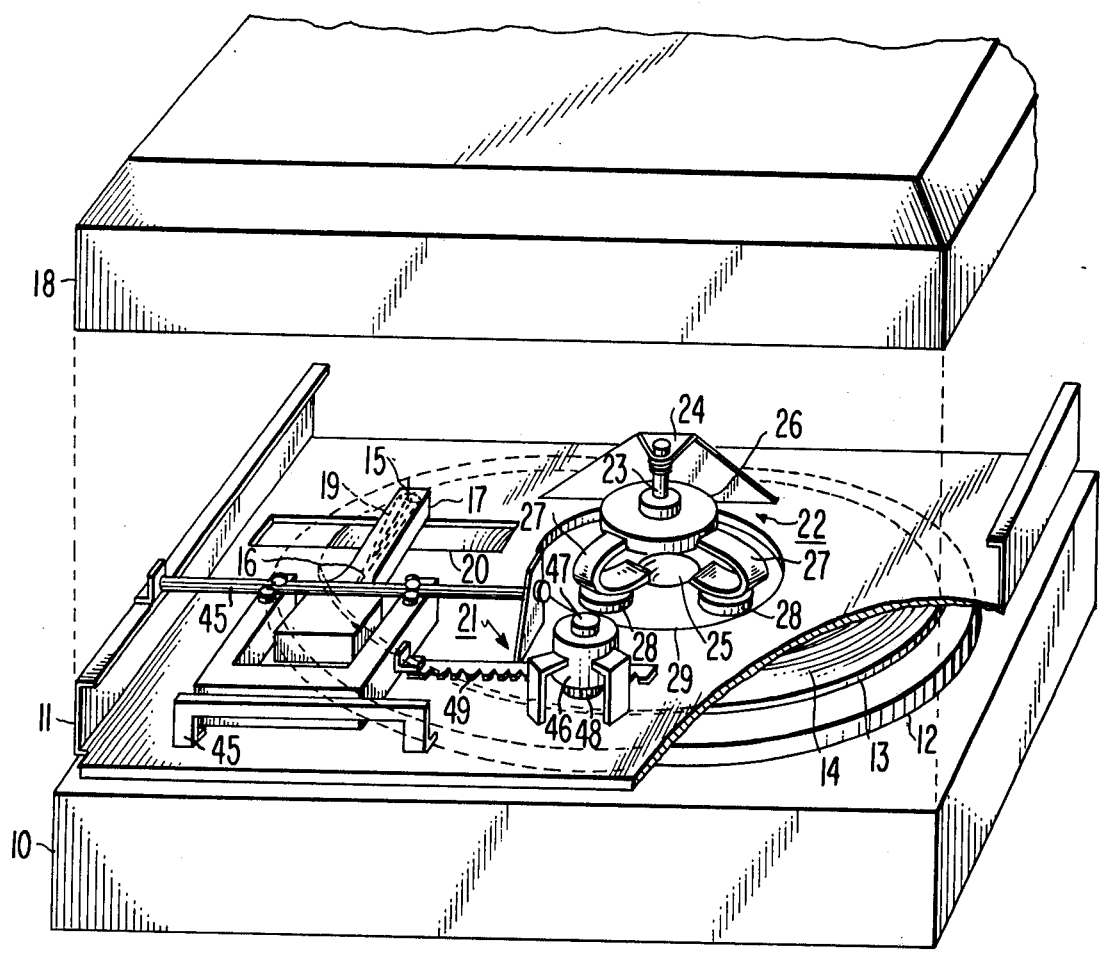
FIG. 1 is an oblique view of a playback system employing an overhead signal pickup drive and a disc record grounding apparatus pursuant to the present invention, the lid is disengaged from the player and a portion of the player is broken away for clarity of presentaton.
Figure 4:
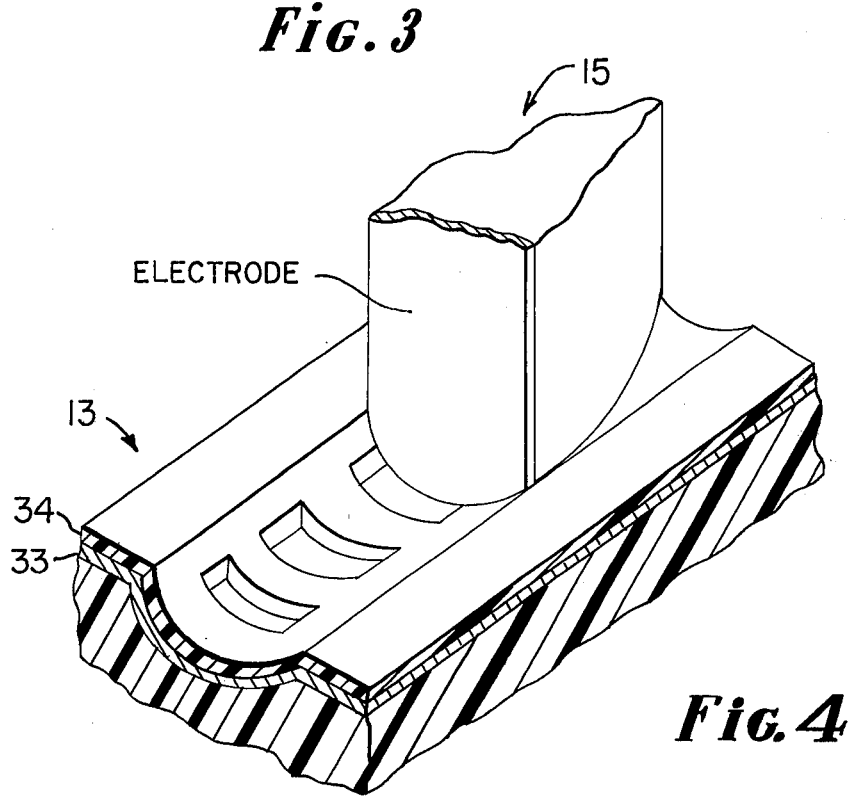
FIG. 4 is a greatly enlarged cross-sectional view of a stylus resting on a disc record of FIGS. 1-3.

Referring to the drawings, wherein like reference numerals designate similar elements in the various views, in FIG. 1 a video disc playback apparatus is shown with a base 10 and a hinged cover 11. The apparatus is suitable for use in a video disc system such as disclosed in the aforementioned Clemens' patent (U.S. Pat. No. 3,842,194). A turntable 12 is rotatably mounted on the base 10. The surface of the turntable is adapted to support a disc record 13. A motor and suitable drive mechanism (not shown) drives the turntable 12 at a predetermined speed when the player is operative. The rotational motion of the turntable 12 is transmitted to the disc record 13 via frictional contact between the turntable and the disc record. Video information is contained in geometric variations in the bottom of a smooth spiral groove 14 on the surface of the disc record 13. The disc record surface includes a coating of conductive material 33 which is preferably covered with a thin deposit of dielectric material 34 over the recorded portion of the disc record 13 as shown in FIG. 4. Thus, a portion of the disc record conductive coating is exposed in an area surrounding the centering hole of the disc record 13. A signal pickup 15, subject to positioning in the groove 14, includes a conductive electrode (FIG. 4) which, together with the conductive coating and the dielectric deposit of the disc record, form a capacitor. When relative motion is established between the signal pickup 15 and the disc record 13, an edge of the conductive electrode included in the signal pickup, while riding in the groove 14, recovers capacitive variations due to geometric variations in the bottom of the spiral groove. The capacitive variations, representative of prerecorded information on the disc record 13, are transmitted via a high frequency (e.g., 915 MHz) transmission line (such as taught in Hilliker's U.S. Pat. No. 3,872,265) to a suitable signal processing circuit. The signal pickup 15 is carried by the free end of a pickup arm 16. The pivoted end of the pickup arm 16 is movably connected to a hollow, box-like conductive support housing 17.

In order to effectively shield the high frequency transmission line, including the conductive pickup arm 16 and the conductive support housing 17, the support housing assembly is enclosed within the cover frame 11 and a cover lid 18, containing at least a thin layer of metal or screening, thereby preventing deleterious effects on surrounding electronic equipment. Apertures 19 and 20 are provided in the bottom walls, respectively, of the support housing 17 and the cover frame 11 to permit the signal pickup 15 to pass through for engaging the disc groove 14 when the player is operative. It must be noted that although in this particular embodiment the aperture 20 remains unsealed when playback is not occurring, a desirable alternative is employment of a cover plate to seal aperture 20 when signal pickup protrusion through the aperture is not required.

The relatively fragile walls of video disc record grooves (for example, in a disc record having 4,000 to 6,000 grooves per inch) cannot be dependably relied upon for the radial tracking of the pickup arm assembly across the recorded surface of the disc record. Therefore, an overhead signal pickup drive apparatus 21 is employed for providing the required radial tracking. The overhead signal pickup drive apparatus illustratively comprises bearing means 45 secured to the cover 11 for reciprocably supporting the support housing 17. A motor 46 is mounted in the cover having a shaft. A pinion 48 is mounted on the motor shaft for rotation therewith. A rack 49 is provided having one end secured to the support housing 17 and engages the pinion 48 for translating rotational motion of the pinion into linear motion of the support housing.

Figure 2:
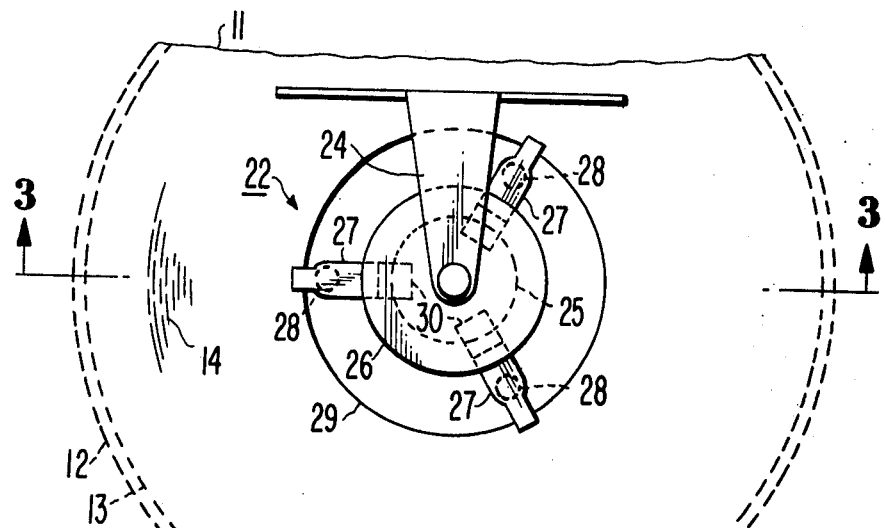
FIG. 2 is a plan view of the disc record grounding apparatus of FIG. 1.
Figure 3:
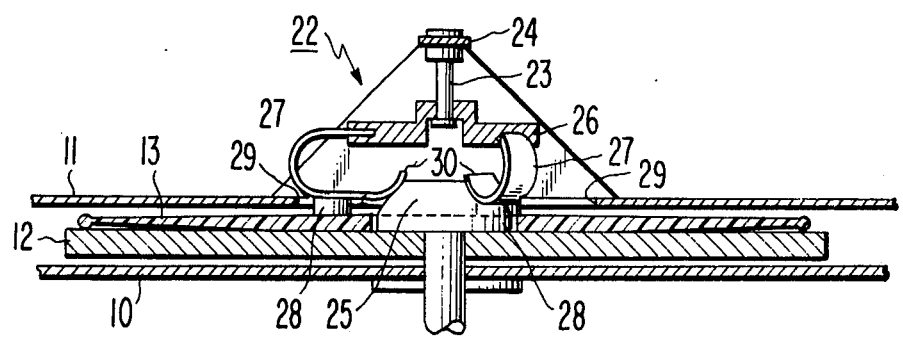
FIG. 3 is a partially sectioned end view of the disc record grounding apparatus of FIGS. 1 and 2 along the line 3—3 in FIG. 2.

A disc record grounding apparatus 22, according to the present invention, for discharging the accumulated charge on the disc record conductive coating; will be described with reference to FIGS. 2, 3, and 4. FIGS. 2 and 3 are, respectively, the top view and the partially sectioned (along the line X—X of FIG. 2) end view of the disc playback system employing the disc record grounding apparatus of FIG. 1. A shaft 23, made of conductive material, is journaled for rotation in a bearing 24 affixed to the cover frame 11. The conductive shaft 23 is electrically coupled to a reference potential (e.g., ground) such as the cover 11 chassis. When the cover 11 is secured onto the base 10, the axis of rotation of the shaft 23 is substantially coincident with the axis of rotation of a centering hub 25 mounted on the turntable 12. A drive plate 26 is coaxially suspended from the shaft 23. A multiple (e.g., in this particular embodiment the multiple is 3) of generally C-shaped leaf springs 27 are affixed to the drive plate 26. A plurality of conductive pads 28 (e.g., in this particular embodiment the number of pads is 3) are attached to the leaf springs 27. Preferably, the conductive pads 28 may be made of resilient material such as conductive rubber. An opening 29 is provided in the bottom wall of the cover 11 for allowing the conductive pads 28 to project through the opening 29 for contacting the disc conductive coating 33 when the cover 11 is secured onto the base 10. The dielectric deposit 34 overlies the disc record conductive coating 33 in the recorded portion of the disc record 13 as shown in FIG. 4. Thus, a portion of the disc record conductive coating 33 is exposed in an area surrounding the centering hole of the disc record 13. The arrangement and the dimensions of the disc record discharge device 22 are such that when the cover 11 is secured onto the base 10, the axis of rotation of the leaf springs 27 is substantially coincident with the axis of rotation of the turntable centering hub 25, and the pads 28 are firmly pressed by the leaf springs against the disc record conductive coating 33 for mechanically and electrically coupling the leaf springs with the disc record conductive coating. The conductive rubber pads 28 make a good and firm electrical contact with the disc record conductive coating 33 surface while rotating with the disc record. The rotation of the pads 28 with the disc record 13 minimizes the wear of the disc record. The leaf springs 27 provide a mechanically flexible coupling between the disc record conductive coating 33 and the point of reference potential (here, cover 11 chassis)by accommodating disc record height variations (due to warpage or due to placement of more than one disc record on the turntable) and misalignment between the axes of the shaft 23 and the centering hub 25.

The inside edges of the leaf springs 27 may be curled as shown at 30 for engagement with the turntable centering hub 25 when the cover 11 is secured onto the base 10. This may be desirable for two reasons. First, it may be advantageous to ground the disc 13 surface through the conductive turntable centering hub 25 instead of through the drive plate 26 and the shaft 23. Second, the engagement between the leaf spring 27 and the turntable centering hub 25 may aid the alignment of the axis of rotation of the shaft 23 with the axis of rotation of the hub 25.

While a particular form of radial drive mechanism (employing a cover mounted motor 46) has been illustrated herein, it should be appreciated that the overhead drive aspect of the present invention may be realized through use of other forms of drive mechanism. As one example thereof reference may be made to the copending U.S. patent application of David W. Fairbanks, Serial No. 557,178, entitled, "OVERHEAD SIGNAL PICKUP DRIVE," and concurrently filed herewith, wherein the overhead radial drive is derived from the turntable rotational motion.

With regard to the overhead grounding aspect of the present invention, it may be noted that whereas the description above assumes the absence of a dielectric layer overlying the disc record's conductive layer in the unrecorded regions engaged by pads 28, the continuance of the recorded region's dielectric layer into such unrecorded regions (as may result from processes chosen for use in coating of the disc records) may nevertheless normally be accepted without prevention of achievement of the desired grounding action. This is so because the normal thickness of the dielectric layer is so minute that the spring biased pads may readily penetrate this layer to effect contact with the disc's conductive layer.

What is claimed is:

1. In a playback system including a base; a turntable rotatably mounted on said base; said turntable having a surface for supporting a disc record; said disc record having a centering hole; a major surface of said disc record having geometrical variations in a spiral groove with information recorded therein; said turntable having a centering hub for concentric alignment of said disc record by engagement of said hub in said centering hole; a pickup arm carrying a signal pickup; said signal pickup during playback subject to a cooperative engagement with said spiral groove for retrieving said information when relative motion is established between said signal pickup and said disc record; said disc record having a conductive coating; a portion of said disc record conductive coating being present in an area surrounding said centering hole; a disc record grounding apparatus comprising:
   a. a point of reference potential for said playback system;
   b. a cover mounted to said base for motion between an open position and a closed position;
   c. a conductive spring element rotatably secured to said cover; wherein when said cover is disposed in said closed position, the axis of rotation of said spring element is substantially collinear with the axis of rotation of said turntable centering hub;
   d. means for electrically coupling said spring element to said point of reference potential; and
   e. a conductive pad affixed to said spring element such that a movement of said cover to said closed position causes said spring element to firmly press said conductive pad against said conductive coating of said disc record, thereby mechanically and electrically coupling said spring element to said disc record conductive coating.

2. A system as defined in claim 1 wherein the disc record conductive coating is covered by a thin deposit of dielectric material over the recorded surface of the disc record leaving exposed an area of the conductive coating surrounding the centering hole.

3. A system as defined in claim 2 wherein the signal pickup further includes an electrode presenting a conductive edge which cooperates with the conductive coating and the dielectric deposit of the disc record to form a varying capacitance indicative of the prerecorded information as the disc record is rotated.

4. An apparatus in accordance with claim 1 including additional conductive spring elements rotatably secured to said cover for rotation about said axis of rotation of said first-named spring element; said additional spring elements being electrically coupled to said point of reference potential; wherein additional conductive pads are secured to said additional spring elements such that a movement of said cover to said closed position causes said additional spring elements to firmly press said additional conductive pads against said disc record conductive coating; wherein said firstnamed spring element and said additional spring elements are disposed symmetrically about the common axis of rotation of said spring elements.

* * * * *

UNITED STATES PATENT OFFICE
CERTIFICATE OF CORRECTION

PATENT NO. : 4,040,634
DATED : August 9, 1977
INVENTOR(S) : MARVIN ALLAN LEEDOM

It is certified that error appears in the above-identified patent and that said Letters Patent are hereby corrected as shown below:

| | |
|---|---|
| In the Abstract, line 8 | change "ae" to --are-- |
| In the Abstract, line 14 | between "pickup record" insert --/-- |
| Column 1, line 20, | after "with" add --the-- |
| Column 1, line 55, | change "prerecordedon" to --prerecorded on-- |
| Column 3, line 39, | change "conjuction" to --conjunction-- |
| Column 4, line 60, | after "coating" delete ";" |
| Column 5, line 48, | change "spring" to --springs-- |

Signed and Sealed this

Twenty-second Day of August 1978

[SEAL]

Attest:

RUTH C. MASON
Attesting Officer

DONALD W. BANNER
Commissioner of Patents and Trademarks